(12) United States Patent
Zenz et al.

(10) Patent No.: US 7,506,145 B2
(45) Date of Patent: Mar. 17, 2009

(54) CALCULATED VALUES IN SYSTEM CONFIGURATION

(75) Inventors: Ingo Zenz, Epfenbach (DE); Thomas Mueller, Oberkirch (DE)

(73) Assignee: SAP AG, Walldorf (DE)

( * ) Notice: Subject to any disclaimer, the term of this patent is extended or adjusted under 35 U.S.C. 154(b) by 436 days.

(21) Appl. No.: 11/323,225

(22) Filed: Dec. 30, 2005

(65) Prior Publication Data

US 2007/0156383 A1 Jul. 5, 2007

(51) Int. Cl.
G06F 9/00 (2006.01)
G06F 15/177 (2006.01)
(52) U.S. Cl. .............................. 713/1; 713/2; 713/100
(58) Field of Classification Search ....................... 713/1
See application file for complete search history.

(56) References Cited

U.S. PATENT DOCUMENTS

| | | | |
|---|---|---|---|
| 5,608,865 A | 3/1997 | Midgely et al. |
| 5,758,154 A | 5/1998 | Qureshi |
| 6,148,277 A | 11/2000 | Asava et al. |
| 6,161,176 A | 12/2000 | Hunter et al. |
| 6,314,460 B1 | 11/2001 | Knight et al. |
| 6,898,703 B1 | 11/2001 | Ogami et al. |
| 6,925,646 B1 | 8/2005 | Korenshtein et al. |
| 6,950,931 B2 | 9/2005 | Wedlake |
| 6,996,517 B1 | 2/2006 | Papaefstathiou |
| 7,188,335 B1 | 3/2007 | Darr et al. |
| 7,246,345 B1 | 7/2007 | Sharma et al. |
| 7,260,818 B1 | 8/2007 | Iterum et al. |
| 7,320,007 B1 | 1/2008 | Chang |
| 2003/0041235 A1 | 2/2003 | Meyer |
| 2003/0221094 A1 | 11/2003 | Pennarun |
| 2003/0225867 A1 | 12/2003 | Wedlake |
| 2004/0205584 A1 | 10/2004 | Pezzanite |
| 2004/0230787 A1 | 11/2004 | Blumenau et al. |
| 2005/0050175 A1 | 3/2005 | Fong et al. |
| 2005/0065993 A1 | 3/2005 | Honda et al. |
| 2005/0071195 A1 | 3/2005 | Cassel et al. |

(Continued)

FOREIGN PATENT DOCUMENTS

EP 1 486 867 12/2004

(Continued)

OTHER PUBLICATIONS

Office Action dated Feb. 20, 2008 for U.S. Appl. No. 11/322,608.

(Continued)

*Primary Examiner*—Thomas Lee
*Assistant Examiner*—Stefan Stoynov
(74) *Attorney, Agent, or Firm*—Blakely, Sokoloff, Taylor & Zafman

(57) ABSTRACT

Methods and apparatuses provide a configuration machine to manage dynamic values within a configuration setting to be resolved at a runtime implementation of a configuration. The dynamic information can be referenced within the configuration setting by a calculated value that provides an expression to be evaluated to resolve the configuration setting. The elements of the calculated value expression can be provided from system-dependent values stored in a system profile and applied to the calculated value expression to result in a configuration setting value to be used by the system in configuration of the system.

16 Claims, 6 Drawing Sheets

U.S. PATENT DOCUMENTS

| | | |
|---|---|---|
| 2005/0144428 A1 | 6/2005 | Rothman et al. |
| 2005/0289169 A1 | 12/2005 | Adya et al. |
| 2006/0047798 A1 | 3/2006 | Feinleib et al. |
| 2007/0094359 A1 | 4/2007 | Lamoureux |

FOREIGN PATENT DOCUMENTS

| | | |
|---|---|---|
| GB | 2374687 | 10/2002 |
| WO | WO 96/26588 | 8/1996 |
| WO | WO 2004/109978 | 12/2004 |
| WO | WO 2005/045670 | 5/2005 |

OTHER PUBLICATIONS

Office Action dated Jan. 8, 2008 for U.S. Appl. No. 11/322,607.
Office Action dated Mar. 19, 2008 for U.S. Appl. No. 11/322,701.
Int'l Application No. PCT/EP2006/012357 Int'l Search Report and Written Opinion mailed Mar. 29, 2007.
PCT/EP2006/012356 International Search Report and Written Opinion dated Mar. 29, 2007.
Int'l Application No. PCT/EP2006/012358 Int'l Search Report & Written Opinion dated Jun. 14, 2007; 5 pgs.
Int'l Application No. PCT/EP2006/012421, Int'l Search Report & Written Opinion dated Oct. 2, 2007.
Anonymous, "Using a Template Processor to Simplify Programming", Research Disclosure, Mason Publications, Hampshire, GB, vol. 41, No. 413, Sep. 1, 1998, 1-3.
Heiss, Oracle Process Manager and Notification Server Administrators Guide; 10g Release 2 (10.1.2) Dec. 2004 XP002449016; Redwood City, CA, USA, Retrieved from the Internet: URL: http://download.oracle.com/docs/cd/B14 [ret'd on Aug. 31, 2007] pp. 1-1 to pp. 1-26 and pp. 3-1 to pp. 3-30.
Microsoft Computer Dictionary, 4th Edition, Redmond, WA, 1999, pp. 123 and 183.
Accomazzi et al.: Mirroring the ADS Bibliographic Databases; Astronomical Analysis Software and Systems VII; ASP Conference Series, vol. 145, 1998, pp. 395-399.
Cutler et al.: SCO UNIX in a Nutshell; O'Reilly & Associates, Inc., Cambridge, MA, Jan. 1994, pp. 154-158.
Duquette et al.: Data Definition and Code Generation in TCL; RIDE-VE 1999, Sydney, Australia, Mar. 23-24, 1999, pp. 1-10.
Bartell et al.: The Mediaxact System System—A Framework for Personalized Electronic Commerce Systems, Bell Labs Technical Journal, vol. 4, Issues 153-173, Apr.-Jun. 1999, pp. 153-173.
Fernandez et al.: Silkroute: Trading Between Relations and XML; Computer Networks, vol. 33, Issues 1-6, Jun. 2000, pp. 723-745.
Hatley: Automatically Generating Procedure Code and Database Maintenance Scripts; Ingres World, Chicago, IL, Oct. 2-6, 1994, pp. 1-11.
Final Office Action mailed Sep. 2, 2008 for U.S. Appl. No. 11/322,701.
Final Office Action mailed Sep. 4, 2008 for U.S. Appl. No. 11/322,608.
USPTO, "6570P322 OA Mailed May 22, 2008 for U.S. Appl. No. 11/322,401", (May 22, 2008), Whole Document.
USPTO, "6570P328 OA Mailed May 23, 2008 for U.S. Appl. No. 11/322,400", (May 23, 2008), Whole Document.
USPTO, "Office Action mailed Jun. 26, 2008 for U.S. Appl. No. 11/322,607", Whole Document.

CALCULATED VALUES IN SYSTEM CONFIGURATION

FIELD

Embodiments of the invention relate to system configuration settings, and more particularly to referenced values for settings.

BACKGROUND

System configuration allows a system to define the values of properties of the system that affect how the system operates. In a network environment, configuration for a system may be obtained over the network. Many times various systems within a network have similar configuration, and may include many or all of the same properties, with a difference in value of the properties. The differences in values may define the difference in system capabilities, and apply a similar application or use case to particular systems. Because systems often include similar configuration fields, there could be a great deal of redundancy in a system regarding configuration of systems with the network. Additionally, changes in system configuration may be desirably extended to every instance of the system in the network. Traditional approaches may require changing each system's configuration.

System configuration has also traditionally been tailored to the system in question, with specific static values relative to the system in question being used to define the configuration. The system-specific values reduce the portability of configuration to systems that share equal properties. In many networks there are differences in the systems that prevent the configuration of one from applying to the other. Thus, there can be a great deal of redundant configuration information within a network, and a great deal of redundant effort to change configuration information.

SUMMARY

A configuration setting can include dynamic information to be resolved at a runtime implementation of a configuration. The dynamic information can be referenced within the configuration setting by a calculated value that provides an expression to be evaluated to resolve the configuration setting. The elements of the calculated value expression can be provided from system-dependent values stored in a system profile and applied to the calculated value expression to result in a configuration setting value to be used by the system in configuration of the system.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
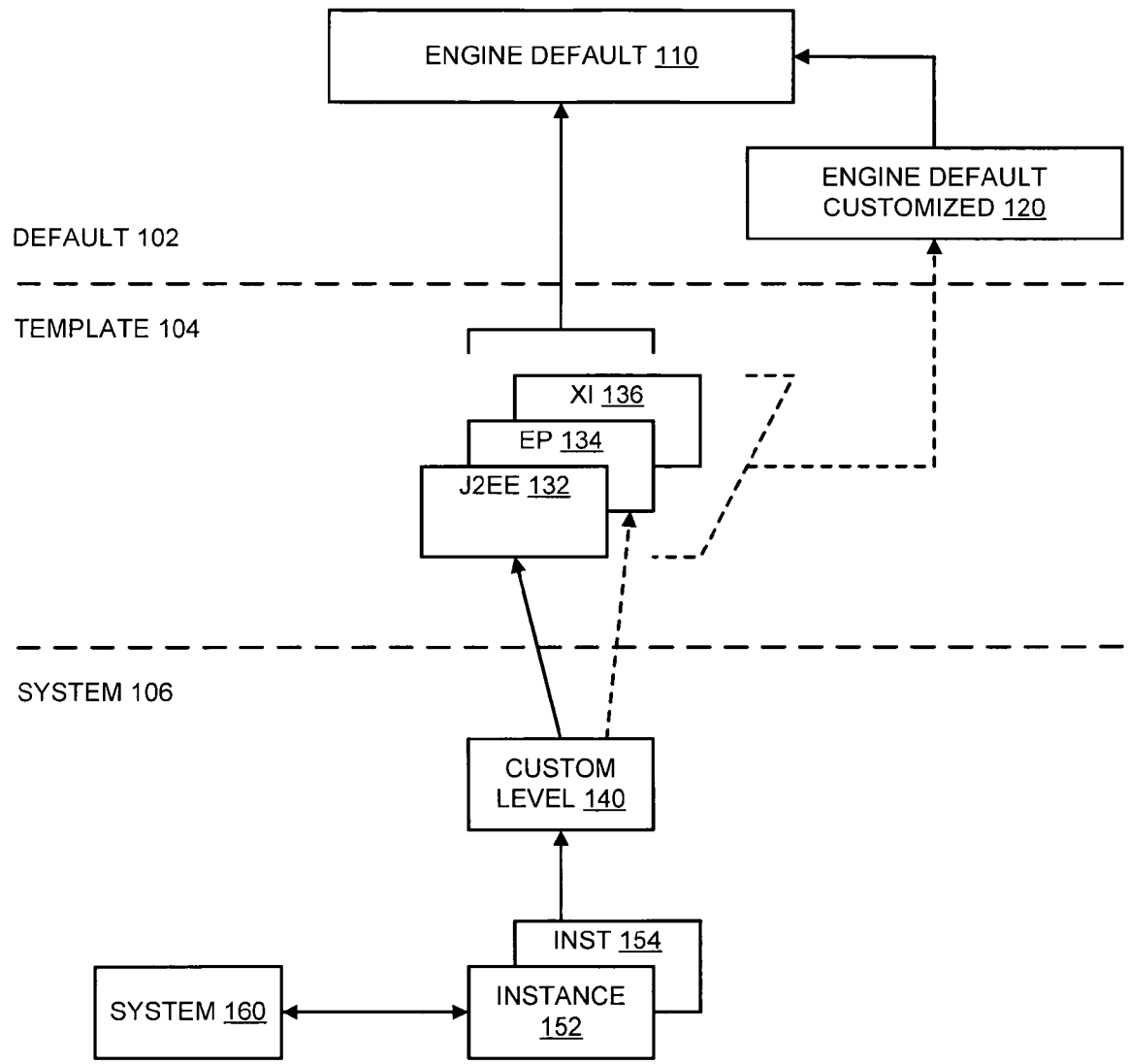
FIG. 1 is a block diagram of an embodiment of an architecture to determine a configuration setting.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A configuration machine/manager can manage a dynamic system configuration that can adapt itself to a specific system environment. For purposes of simplicity and consistency of description, the term "configuration machine" will be used to describe any implementation of an entity to manage configuration as described herein. It will be understood that a configuration machine could include hardware and/or software to implement the management/control features described. Thus, the use of the term configuration machine will be understood as including any entity with the features described herein, and should not be understood as limiting.

The configuration machine in the context of a dynamic configuration includes features for parameterized and computed configuration. The dynamic configuration can be implemented with templates or other default settings. As used herein, "template" refers to a group, set, structure, etc., of one or more settings that can be used as defaults, or master settings, or other mechanism from which a setting may be derived or obtained. A template can be pushed to a system and/or requested and obtained from a system. As used herein, "configuration" refers to one or more settings or values that define a state, an operation, a value, or other value that directs or affects how a computing device operates. A setting thus refers to any property, or value, whether directly or indirectly (e.g., linked) obtainable/usable, and/or whether dynamic or static.

The configuration machine can derive one or more configuration setting from another configuration to reduce redundancy of information within a system/group of systems. To enable the derivation of settings, the configuration machine may provide features for linking to values and inheriting configuration. In short, instead of having all configuration settings within a networked system be static values for system dependent configuration as is done in traditional systems, the configuration machine can enable the use of parameterized settings to provide dynamic configuration. Parameterized settings include parameters provided by the configuration manager, which can be transparently substituted during runtime. The substitution of actual values, which can be referred to as computed or direct values, for the parameterized settings, can be referred to as resolving the parameterized setting or computable expression. As used herein, a parameterized value refers to a dynamic value as set forth above, which can be provided by the system context/profile, and may be referred to as a computable expression, as discussed in more detail below. A system profile may contain system dependencies (e.g., host names, operating system information, installation directories, etc.) in addition to hardware dependencies (e.g., number of CPUs, amount of physical memory, etc.).

In one embodiment, a parameterized value includes a simple arithmetic expression that may contain system parameters from a system profile. The system profile refers to one or more values or parameters that describe a system (e.g., system properties, numbers of particular elements (e.g., processors, amount of memory), capabilities, etc.). The system may be any entity that has services, managers, etc., which provide functionality in a network (e.g., one or more server nodes). The system profile may be stored in the configuration machine and/or the configuration machine may have access to another network location where the profile is stored. During or at runtime, the configuration machine can substitute or resolve parameters, for example, by transparent substitution of indirectly referenced values and/or evaluating an arithmetic expression. Computed settings allow a system to utilize a dynamic setting where a simple parameter substitution is not sufficient, for example, where a value needs to be calculated in light of specific system parameters (e.g., number of nodes, heap size, etc.).

Settings may also include a link to other settings, which may be referred to as a "value link." Thus, if a setting is dependent on another setting stored elsewhere, a value link establishes a relationship between the settings, and defines one setting in terms of another. During or at runtime a value link is transparently resolved and substituted. Value link settings may be combined with the feature of computed and parameterized values, for example, in a case where a system dependent configuration cannot be configured via simple parameter substitution. Thus, a value link may refer to a computed value setting, and/or a value link may be included within a computed value.

Examples of a computed/calculated value may be the following. A Telnet port may be defined as: 50000+100*${INSTANCE_NUMBER}+8, where instance number refers to a parameter that may be obtained from a system profile, and might be different from one system to another (meaning a dynamic parameter). A number of server nodes per instance may be defined as: 2*${CPU_COUNT}, where CPU_COUNT represents a dynamic parameter. A maximum heap size could be defined as: 128 max (${AMOUNT_MEMORY}/${CPU_COUNT}), where dynamic parameters and a "max" operation are used. An arithmetic expression may include any combination of parameters, constants, simple operators, and brackets. In one embodiment, supported operators may include: '+', '−', '*', '/', 'min', 'max'. A "round" function (e.g., expr=round(expr1)) or a "truncate" function (e.g., expr=trunk(expr1)) could also be used.

In one embodiment, the configuration machine supports an inheritance relationship between configuration objects. A configuration object is any object (referring to a structure in which data and control/behavior characteristics are associated together) that includes data related to configuration, and may specifically have configuration settings. Although a configuration object may be understood in light of object-oriented programming languages (e.g., JAVA), an object as used herein may refer to any mechanism or structure that allows behavior to be defined for data types. The semantics of configuration inheritance may be described as follows. In one embodiment, all the following apply. In alternative embodiments, one or more of the following apply as configuration inheritance. In a case where configuration B is derived from a configuration A:

1) Configuration content available in A that does not exist locally in configuration B is inherited, and thus visible in configuration B;

2) Local content of configuration B has priority over inherited content from configuration A, which allows content to be overwritten locally in configuration B, which causes the content to be generated to exist physically in configuration B. The overwritten local content will be visible in configuration B and not the inherited content available from configuration A;

3) All content of a configuration (e.g., configuration entries, files, sub-configurations) is subject to inheritance;

4) The inheritance relationship is assigned to the whole configuration sub-tree, rather than to only one configuration node. Assigning the inheritance relationship the whole configuration sub-tree implicitly defines an inheritance relationship to a local sub-configuration of configuration B (e.g., $B_{sub1}$) from a corresponding sub-configuration of configuration A (e.g., $A_{sub1}$). A "corresponding" sub-configuration refers to a sub-configuration that has a relationship with another configuration, and generally refers to a similarity between the configurations (e.g., they derive from common nodes with the primary configurations, for example, A-node 1 and B-node 1). In one embodiment, the sub-configuration inheritance relationship holds even in a case where the corresponding sub-configuration in configuration A does actually exist in configuration A. Thus, if a corresponding sub-configuration in configuration A were later generated in configuration A, the sub-configuration of configuration B would inherit from it;

5) A derived sub-configuration in configuration B cannot be explicitly created. All sub-configurations in B are implicitly derived from corresponding sub-configurations in configuration A, so no explicit derivation needs to be, or can be, created.

Inherited configuration may be restricted from modification. In one embodiment, a configuration and/or property/setting of a configuration is flagged or otherwise indicated as non-modifiable, unchangeable, or "final." A configuration that is non-modifiable refers to a configuration that can be derived, but one or more elements or properties of the derived configuration cannot be locally modified. In the case of an entire configuration being flagged as non-modifiable, the deriving configuration may be prevented from adding, deleting, or modifying any content in the entire configuration. The default configuration can still be modified, which would change the properties of the derived configuration, but the derived configuration may be prevented from making any changes. By implication, sub-configurations and properties of a configuration marked as non-modifiable can be likewise non-modifiable. In the case that only specific content/properties of a configuration are flagged as final, the particular flagged content cannot be changed, but other content may be. As with entire configuration marked as non-modifiable, specific flagged content may be changed in the default configuration. Thus, a default configuration may include one or more flagged properties, or the entire default configuration may be flagged as non-modifiable. A configuration derived from the default configuration with "final" properties may modify properties not flagged as non-modifiable, but may not modify the flagged properties/configurations.

In one embodiment, a configuration template contains one or more predefined instance configurations for a specific use case or scenario (e.g., Portal+KM (knowledge management), Minimal Instance, J2EE (JAVA 2 Enterprise Edition of SUN MICROSYSTEMS, Inc., of Santa Clara, Calif.) Developer, etc.). In one embodiment, a configuration template may be implemented in a system that does not contain any system dependent configuration; rather, all system dependencies are configured via dynamic configuration resolved through a configuration machine. In this way, a configuration template can be system-independent and can be moved between different systems. As used herein, "system-independent" refers to being independent, or not including settings or data limited to a specific property of a specific implementation of the setting/data. For example, a template can be established for a network of computing devices (e.g., instances with their server nodes), each of which will have one or more instances of a configuration. The template can be considered system-independent if defined to enable all instances within the system of the network. All instances could use the same template and incorporate settings specific to each instance, which may be different in other instances of the system. Thus, a configuration template can be derived from a default configuration and overwrite settings of the default configuration according to a specific usage to which the template is assigned. In one embodiment, a template can be homogeneously configured, with all server nodes of an instance sharing one and the same configuration.

A configuration template may contain many different elements, depending upon the implementation of the template and the system for which the template provides configuration (e.g., scenarios for portal+KM, J2EE developer, etc.). In one embodiment, a configuration exists for an enterprise environment where a configuration template includes one or more of the following: instance layout configuration related to a number of server node running on an instance (determined, for example, by an arithmetic expression dependent on the hardware (e.g., number of central processing units (CPUs) and memory) available), a JAVA Virtual Memory (JVM) configuration with VM settings and VM parameters to enable the instance layout to dynamically adapt itself to the environment on which the instance is running, a kernel configuration, an application configuration, service settings, a file system configuration, system component configurations, etc. The list should not be understood as an exhaustive description of possible configuration properties, nor are all elements of the mentioned elements required. Thus, the list is to be understood as merely one example of possible types of configuration that a template may include, and other implementation may include more or fewer elements, and/or different elements.

In one embodiment, the configuration templates are derived from a configuration "basic instance" that defines the basic structure of an instance configuration. In one embodiment, the derivation from the basic instance can be indirect through another level between the instance configuration and the configuration templates. For example, a "basic instance customized" can be defined for the system configuration, and provide a mechanism to store and change system global configuration settings. Configuration templates can be limited to modification only via deployment. Thus, configuration changes occur through changes at a system level configuration, and changes to a template may not be possible via configuration tools (e.g., Visual Admin, Web Admin, Config-Tool, etc., of a system available from SAP AG of Walldorf, Germany).

A special "minimal instance" template can be defined for use during instance installation. The minimal instance can contain everything needed to run the central configuration. The central configuration can then be used to select and set a specific use case template for the instance to be configured.

The system configuration contains the configuration of the actual system. The actual system configuration is the configuration of the actual instances belonging to the system. An instance is assigned to the use case and scenario which is to be executed by the instance during runtime. Thus, the instance configuration can be derived from the configuration template belonging to the corresponding use case and scenario. The implementation of a configuration can be said to be implemented in a configuration consumer, which may refer to any application, system service, system manager, or other server entity on, for example, a server node.

As the configuration template contains the system dependencies in a dynamic way (e.g., with parameterized and computed settings), the actual instance configuration may not need to overwrite a setting for the system dependencies defined in the template. The system dependent configuration will dynamically adapt itself to the actual system environment. Therefore, the engine runtime itself does not need any additional configuration, and can operate without overwriting any settings inherited from the configuration template.

In some cases, there may be a need to customize additional engine components (e.g., configuring landscape connectivity, etc.). Additional customizing configuration can be performed at a special customizing layer per configuration template. When the first instance for a specific configuration template is created, a first customizing configuration for the template can be created within the system configuration. The customizing layer may be derived from the actual template, and the instance configuration may be derived from the customizing layer of the selected template. Configuration changes on the level of the custom layer are visible across all instances assigned to the same configuration template.

FIG. 1 is a block diagram of an embodiment of an architecture to determine a configuration setting. The architecture of FIG. 1 includes different levels of configuration settings. Specifically shown are a Default level 102, a Template level 104, and a System level 106. Additional or different levels may be used. In general, the different levels represent a basic, system-independent, generic level (Default level 102), a system-independent level that may include use-cases (Template level 104), and a system-specific level (System level 106).

Engine default 110 represents a default configuration as described above, which provides system-independent configuration settings. Engine default 110 provides defaults for an software engine suite, for example, a J2EE engine, upon which instances of an application, program, routine, etc., will be based. Engine default 110 can include any number of configuration settings, and any type of settings that are desired to be common across all systems and all implementations in a network. In one embodiment, Default level 102 includes engine default customized 120, to provide a degree of further customization for a cluster (or instance of a cluster). Engine default customized 120 derives from engine default 110, and can provide specific details for an enterprise or a network. For example, engine default 110 may be a configuration suite available for any system to be developed in any system within an enterprise, or within any enterprise that will employ a particular application, software, etc. Engine default 110 can thus be generic to any system within an enterprise, for example, and be ported across the entire enterprise. Engine default customized 120 can be a logical level lower, and provide customization that is specific to a particular network, or department. If a department wants particular settings to apply to all systems within the department, it may generate engine default customized 120 to provide those defaults.

Templates 132-136 may derive directly from engine default 110. Additionally, depending on the implementation, templates 132-136 may derive from engine default customized 120, to provide the customized settings in all use case templates. In the example of FIG. 1, template J2EE 132 provides an example of a template for a J2EE development environment, with associated settings that are appropriate within the context of engine default customized 120. Also shown are template enterprise portal (EP) 134 that provides configuration settings for portals to be used in systems of the network. Enterprise portals provide single points of access to a network and/or to network content. The settings of EP 134 provide the default configuration for access with portals in any application that uses portals. Thus, the settings of EP 134 provide a default configuration for a system where a portal is being executed. Template exchange infrastructure (XI) 136 can provide configuration setting defaults for exchange infrastructures for accessing business objects within an enterprise.

In one embodiment, System level 106 may include custom level 140, which provides another optional custom layer. Custom level 140 derives from the templates as a whole, or from individual templates. Thus, custom level 140 can provide custom system level configuration for each template system 160 may use, or multiple custom level can exist and derive from each template separately. Custom level 140 may provide a custom configuration setting on System level 106 for each instance of a particular type of template (e.g., all J2EE instances), or custom level 140 may provide a custom configuration setting for instances of different types (e.g., J2EE and EP instances). Instances 152-154 derive, in turn from custom level 140. In one embodiment, one or more instances 152-154 may derive directly from a template. Each instance implementation obtains the default configuration settings, unless the settings are overwritten at System level 106 (e.g., custom level 140), or higher up (e.g., engine default customized 120, a template).

The configuration settings are passed to system 160 for implementation in each instance on system 160. System 160 is to be understood as any type of computing device, including, but not limited to, a desktop computer, a laptop computer, a server-class device, a handheld device, etc. The indirect values of configuration settings in Default level 102 and Template level 104 are resolved by a configuration machine to be implemented at System level 106. In this manner portable configurations can be generated and ported from one system to another, with the indirect values of the computed values, value links, parameterized settings, etc., resolved for implementation of the configuration in system 160.

Figure 2:
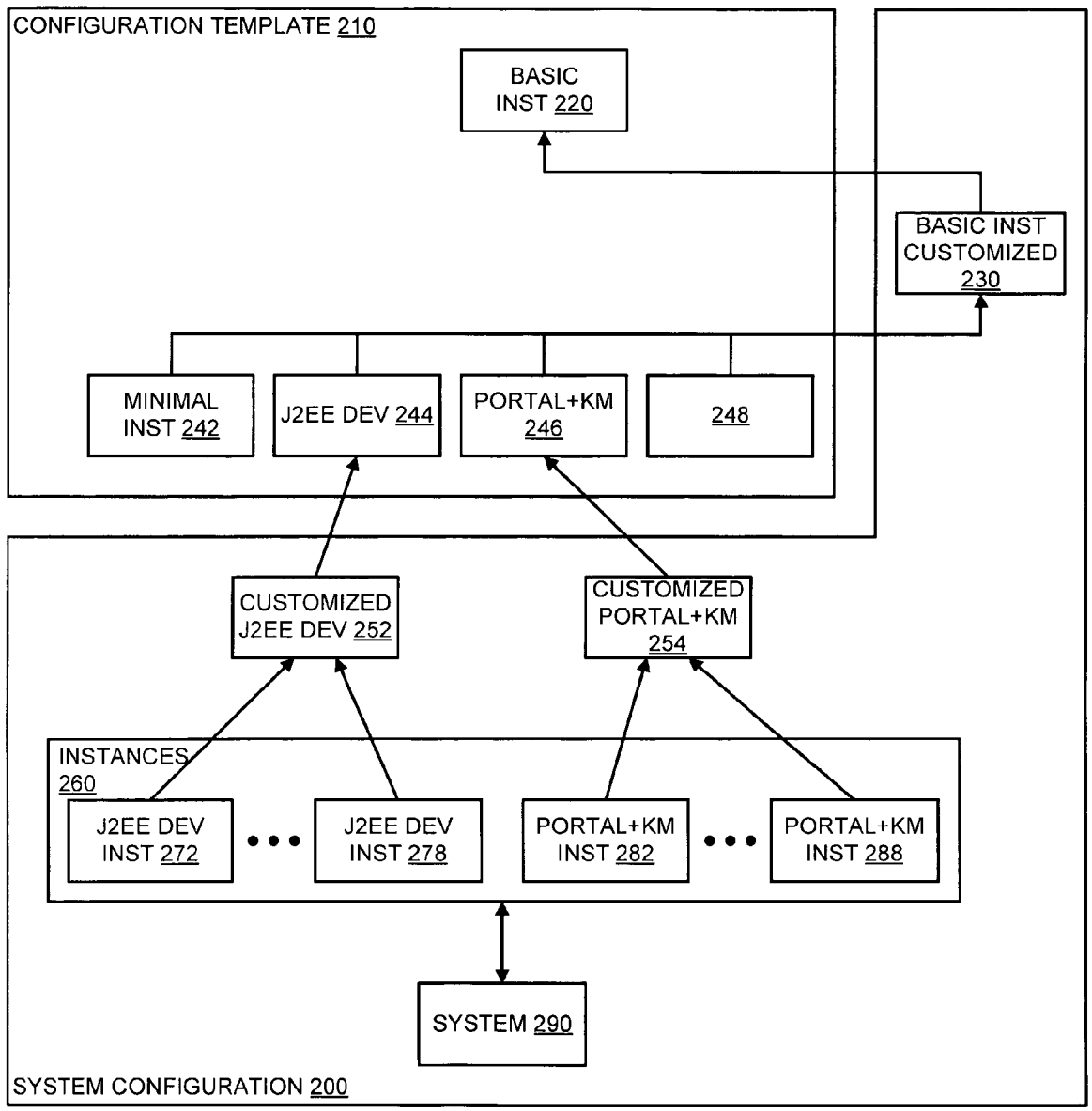
FIG. 2 is a block diagram of an embodiment of an architecture having a basic instance and a customized instance of a setting to determine a configuration setting for a system.

FIG. 2 is a block diagram of an embodiment of an architecture having a basic instance and a customized instance of a setting to determine a configuration setting for a system. Configuration template 210 provides an example of a default as described herein, which may include a template. Configuration template 210 includes basic instance 220, which represents a basis from which the configuration machine will derive configuration settings for a system. Basic instance customized 230 can provide custom configuration changes to basic instance 220, to enable a user (e.g., an administrator, a developer), to modify the basic instance defaults for specific scenarios within a system of a network.

Instance templates can derive from basic instance customized 230. Examples of instance templates include minimal instance 242, for use in initializing a system, J2EE developer instance 244, for example, for use by an engineer, portal+KM (knowledge management) instance 246 for use in providing portal access to an enterprise on a system, and any other instance 248 that may be provided. Within system configuration level 200 there may be customized J2EE developer configuration 252 and customized portal+KM configuration 254, which derive from corresponding templates. Thus, customized J2EE configuration 252 derives from J2EE developer template 244. Customized J2EE configuration 252 allows custom settings to be defined for corresponding system level instances (e.g., all instances within a cluster). Thus, instances 260 includes J2EE developer instances 272-278, which derive from customized J2EE developer configuration 252, and portal+KM instances 282-288 derive from customized portal+KM configuration 254. Instances 260 can be implemented on system 290.

Regarding the relationship of the elements in FIG. 2, the arrows point to the source of inheritance, or from where an element is derived. Thus, a change on the level of customized portal+KM configuration 254 applies to all portal+KM instances 282-288 within the cluster. Configuration for a single instance can be changed on the instance level (e.g., a change within instance 282). To change a setting not only on the level of one usage (e.g., for one template), but for the whole network, and thus for all usages which are activated in the network (e.g., a configuration setting is to be changed for all J2EE developer instances 272-278 and all portal+KM instances 282-288), the configuration change is performed on the level of basic instance customized 230. All instances inherit configuration (e.g., properties, content, data) from basic instance customized 230, and thus a configuration change on this level is visible globally, unless it is overwritten locally, or down the chain. A configuration machine provides resolution of settings that have indirect values, or settings with references to be resolved at runtime. The configuration machine ensures that configuration settings sent to system 290 have direct value parameters that can be implemented on system 290.

In one embodiment, instances may be configured via different configuration templates. In another embodiment, all instances are configured via the same configuration template, and instances configured for different usages.

Figure 3:
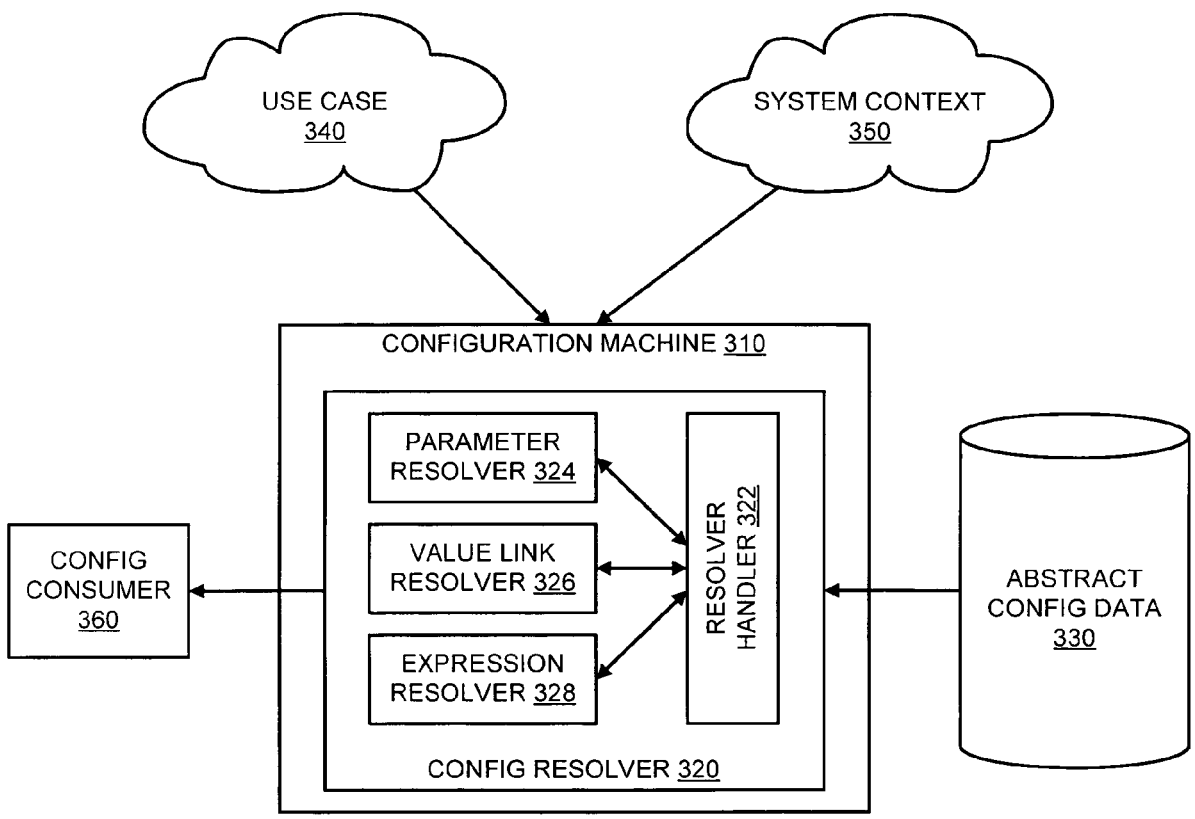
FIG. 3 is a block diagram of an embodiment of network system with a configuration machine.

FIG. 3 is a block diagram of an embodiment of network system with a configuration machine. Configuration machine 310 represents an embodiment of a configuration machine according to any embodiment referred to herein, or other entity that provides resolving or substitution of values for settings to a system. Configuration machine includes configuration resolver 320, which provides the functionality to resolve indirect value settings. In one embodiment, resolver 320 includes resolver handler 322, which may filter incoming configuration settings to make sure they are settings that can be set in configuration consumer 360 (e.g., a system component, service, manager). Configuration machine 310 receives one or more settings from abstract configuration data 330, which represents parameterized configuration, or any other indirect values for settings. Note that abstract configuration data 330 may exist in the same physical memory as static settings. Thus, abstract configuration data 330 is not to be interpreted as necessarily occupying separate memory/storage space, although it may.

Configuration settings are received by resolver handler 322, which can determine if a setting requires resolution, or whether they are actual values and can be forwarded to configuration consumer 360. If resolver handler 322 determines that the setting requires resolution because it is an abstract value, the appropriate corresponding resolver is selected to resolve the setting. In one embodiment, a setting that has an abstract value is flagged. The flag may be a field (e.g., bit or byte) on the setting, or metadata, or any other mechanism to indicate the setting should be resolved prior to sending to configuration consumer 360. The flag is stored with its corresponding dynamic value in a configuration storage.

Resolver handler 322 may determine the type of resolver corresponds to the type of abstract data. In one embodiment, resolver handler 322 includes a parser that can parse the expression of the setting and determine whether a parameter substitution, calculated value, etc., is included. In an alternate embodiment, the flag that indicates the abstract data may indicate the type(s) of resolver that should be used. If the setting includes a parameter, resolver handler 322 may pass the parameter or the expression to parameter resolver 324 to obtain the value. Parameter resolver 324 may obtain specific values referenced in the expression, for example, from a profile of the system stored in configuration machine 310 or somewhere accessible to configuration machine 310. If the setting includes a value link, resolver handler 322 uses value link resolver 326 to determine the value to which the value link points. If the setting includes a calculated value, resolver handler 322 uses expression resolver 328 to determine the value of the expression. One setting can also combine different dynamic values (e.g., one or more parameterized values combined with one or more calculated values), in which case the resolving may be processed analogously as if only one dynamic value is used.

In one embodiment, a setting may include multiple forms of abstraction. For example, a value link may point to a calculated value. Thus, resolver handler 322 may use value link resolver 326, which returns the computable expression to resolver handler 322. Resolver handler 322 may then pass the expression to expression resolver 328 to compute the expression. If the expression has an indirect parameter, resolver handler 322 may be requested by expression resolver 328 to pass the value of the indirect parameter to expression resolver 328 to resolve the value of the expression. Thus, resolvers 324-328 may exchange multiple times between resolver handler 322 to obtain a final value for a setting. Once a final setting value is obtained, the setting can be passed to configuration consumer 360 for setting the value in its configuration.

In one embodiment, configuration machine 310 caches results of parameters, calculated values, or other setting properties that are resolved. The cache size and cache management are implementation-specific. Caching the results can allow resolver handler 322 to bypass operations performed by the resolvers to determine a value of an abstract value. For example, resolver handler 322 can check a cache when a setting is received, and determine whether any indirect values in the setting have previously been resolved. If the values have been resolved, resolver handler 322 may input the cached result without having to allow the resolvers to process the abstract values.

Configuration machine 310 can receive input from (or obtain data from) use case 340 and system context 350. Use case 340 and system context 350 may specify or imply what template(s) should be obtained from configuration data, which in turn can indicate what abstract data to retrieve from abstract configuration data 350. Use case 340 and system context 350 may specify what defaults should be used, and/or what default values to override with local information.

Figure 4:
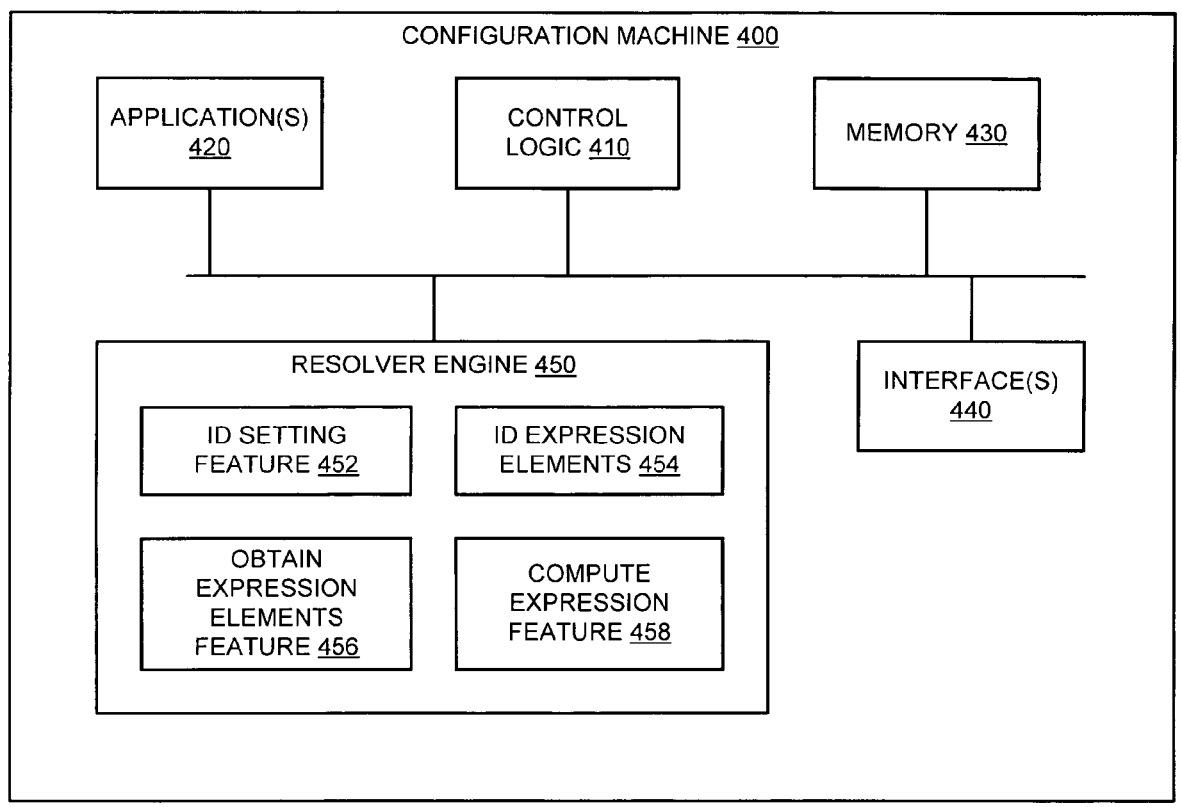
FIG. 4 is a block diagram of an embodiment of a configuration machine.

FIG. 4 is a block diagram of an embodiment of a configuration machine. Configuration machine 400 is an example of a security configuration machine according to any embodiment described herein. In one embodiment, configuration machine 400 resides on a network server. Alternatively, configuration machine 400 can exist independently as a standalone device, or as part of a component of a network.

Configuration machine 400 includes control logic 410, which implements logical functional control to direct operation of configuration machine 400, and/or hardware associated with directing operation of configuration machine 400. Logic may be hardware logic circuits and/or software routines. In one embodiment, configuration machine 400 includes one or more applications 420, which represent code sequence and/or programs that provide instructions to control logic 410. Configuration machine 400 includes memory 430 and/or access to memory resource 430 for storing data and/or instructions, including configuration settings. Memory 430 may include memory local to configuration machine 400, as well as, or alternatively, memory of a network of which configuration machine 400 is a part. Memory 430 may include dynamic and/or non-volatile memory. Configuration machine 400 also includes one or more interfaces 440, which represent access interfaces to/from configuration machine 400 with regard to entities (electronic or human) external to configuration machine 400. Interfaces 440 may include interfaces from configuration machine 400 to configuration management functions operating in the network (e.g., a network interface and/or network interface circuit, or access to a network interface circuit of a host network device).

Configuration machine 400 also includes resolver engine 450, which represents one or more functions that enable configuration machine 400 to provide management of abstract configuration values. The functions can include, or are provided by, one or more of identify (ID) setting feature 452, identify expression elements feature 454, obtain expression elements feature 456, and compute expression feature 458. Other features may be included, making other versions of resolver engine 450 that are more or less complex than what is shown. As used herein, "feature" may refer to a function, a module, a routine, a subsystem, etc., whether hardware, software, or some combination. Thus, "feature" should be interpreted in an illustrative, and not a restrictive sense. Each feature could be a module within configuration machine 400.

Identify setting feature 452 enables resolver engine 450 to identify a setting and determine whether the setting has an expression to resolve, whether a result for a resolution of a value of the setting is cached, and/or which resolver(s) should be used to compute a value for the setting. In one embodiment, identify setting feature 452 may simply evaluate one or more bits or fields in a setting/metadata to determine the information mentioned above.

Identify expression elements feature 454 enables resolver engine 450 to identify an expression within a setting that should be resolved (e.g., that has a computable expression as a setting), and identify the separate parts of the expression (e.g., when multiple indirect value types are used). In one embodiment, identify expression elements feature 454 includes a parser to separate syntax of an expression of a setting and determine the parts that should be resolved. The parser may search the expression for one or more key phrases, delimiters, etc.

Obtain expression elements feature 456 enables resolver engine 450 to obtain the separate identified elements of the expression. In one embodiment, separate resolvers have logic to obtain values related to their corresponding indirect value type. In another embodiment, resolver engine 450 includes functionality to obtain elements of all types.

Compute expression feature 458 enables resolver engine 450 implement the computable expression identified. Compute expression feature 458 may include the use of various arithmetic and/or logic functions to perform operations on the setting. Thus, a template of referenced values can be resolved at runtime, or execution of instructions controlling the configuration settings, to provide configuration settings for a system.

Modules and/or engines as described herein are components that may include hardware, software, and/or a combination of these. Software to instruct a machine to implement the techniques herein, or software to use to manufacture a device to perform the techniques described herein may be provided via an article of manufacture by a machine/electronic device/hardware. An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 5:
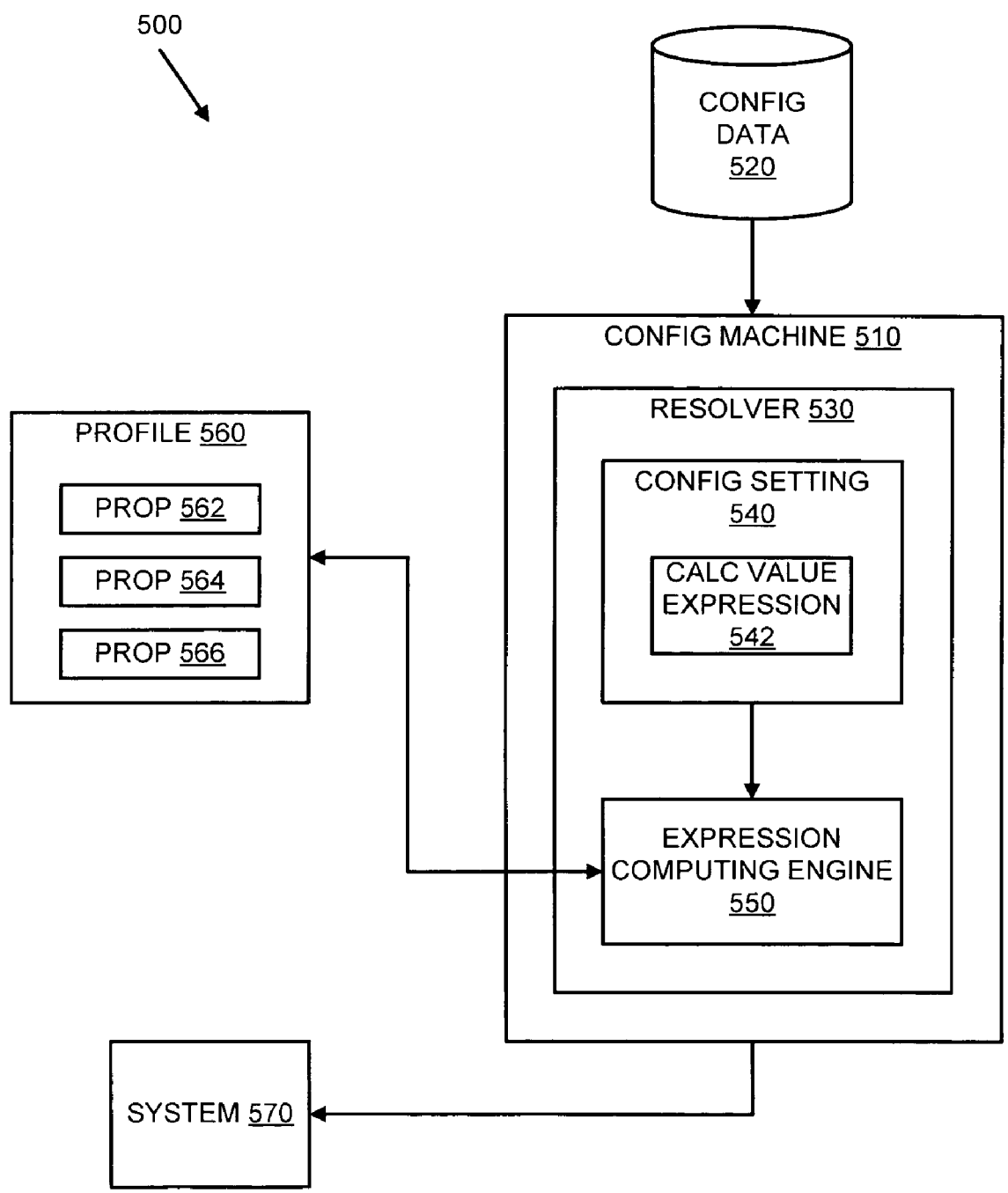
FIG. 5 is a block diagram of an embodiment of an indirect configuration setting.

FIG. 5 is a block diagram of an embodiment of an indirect configuration setting. Environment 500 represents an example of any embodiment of a network as described herein. Configuration machine 510 receives a configuration setting from configuration data 520. As described above, configuration machine 510, determines what settings need to be processed prior to sending the configuration to system 570. In one embodiment, resolver 530 provides an example of a resolver for calculated values. Thus, configuration setting 540 is sent to resolver 530 for processing. Configuration setting 540 includes calculated value expression 542 to be resolved.

Resolver 530 includes, or is coupled (whether one or more of logically, communicatively, electrically, and/or physically) to expression computing engine 550. Expression computing engine 550 enables resolver 530 to access parameter values and perform one or more operations on calculated value expression 542 to determine a value for the expression. In one embodiment, profile 560 is stored within configuration machine 510 that provides one or more properties 562-566 related to system 570. Thus, expression computing engine 550 may obtain system-specific values with which to resolve calculated value expression 542 with respect to the specific system from a template with system-independent references.

Figure 6:
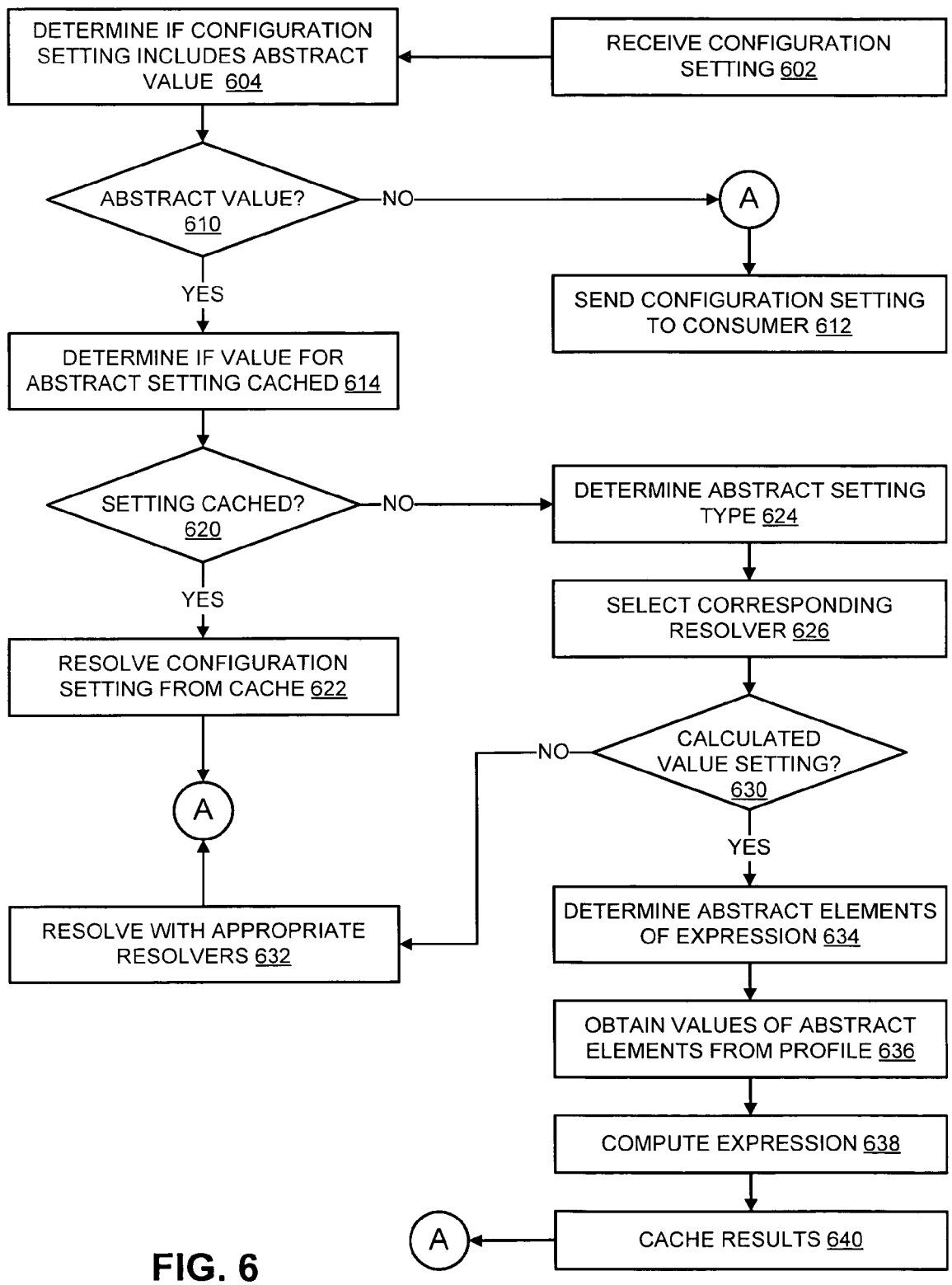
FIG. 6 is a flow diagram of an embodiment of setting a system configuration.

FIG. 6 is a flow diagram of an embodiment of setting a system configuration. A configuration machine as described herein receives a configuration setting, 602. In one embodiment, the configuration machine receives traditional static-value settings as well as dynamic settings with references to one or more objects to define the setting. In a case where both types of settings can be received, the configuration machine determines if the configuration setting includes an abstract value, 604. An abstract value refers to any type of abstraction that is to be resolved at a runtime implementation of the configuration to obtain the value of the setting. If the setting does not include an abstract value, 610, the setting can be sent to a configuration consumer, or a computing device on which the configuration will be implemented, 612. If the setting includes an abstract value, 610, the configuration machine may determine if the value for the abstract value setting is cached, 614. If the setting is cached, 620, the configuration machine can resolve the configuration setting from the cached value, 622, and the setting sent to the consumer, 612.

If the value is not cached, 620, the configuration machine may determine what type of abstraction is involved to determine what service or services (e.g., resolvers) will be used to resolve the setting, 624. The configuration machine can then select one or more corresponding resolvers, 626, to obtain a value for the setting. For purposes of the description herein, there is particular interest in whether the abstract setting includes a calculated value. Thus, for purposes of description herein, the case of whether the abstract setting is a calculated value is described. If the configuration machine determines that the setting does not include a calculated value, 630, the abstract setting is resolved with whatever other resolver service is appropriate for the particular term or expression under question, 632. A setting can have a single abstract reference, or several. Once all resolvers (parameters, value links, and calculated value expressions) are processed, the value of the setting is fully resolved. An operation to "resolve parameters" or "resolve value links" can resolve all dynamic content at once.

If the configuration machine determines that the setting includes a calculated value, 630, the configuration machine determines the elements of the expression in question, 634. The known values of the elements can be obtained from a system profile and/or the cache, 636. With the parameters known and substituted, the configuration machine can compute the expression, 638. In one embodiment, a configuration machine caches the results obtained through calculating the expression, 640.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for providing a configuration setting, comprising:
   determining that a configuration setting obtained from a configuration storage includes a computable expression, the computable expression having system-independent variables, the determining including identifying a flag of the configuration setting, the flag to indicate the configuration setting has a computable expression;
   resolving the computable expression to determine a system-dependent value for the configuration setting for a runtime implementation of a system configuration;
   caching the system-dependent value of the configuration setting, as determined by resolving the computable expression, in a memory;
   forwarding the configuration setting to a configuration consumer.

2. The method of claim 1, wherein the computable expression with the system-independent variables is obtained from a configuration setting template that references no system-dependent values.

3. The method of claim 1, wherein resolving the computable expression further comprises:
   obtaining data from a system profile having system-dependent properties of the system to be used to resolve the computable expression.

4. The method of claim 1, wherein resolving the computable expression comprises:
   operating on the computable expression with an operator from the set of: addition, subtraction, multiplication, division, a minimum-value operator, a maximum-value operator, a round function, or a truncate function.

5. The method of claim 1, wherein sending the configuration setting to the computing device further comprises:
setting a configuration setting within the context of the configuration consumer to the resolved value of the configuration setting.

6. The method of claim 1, wherein the configuration consumer comprises one or more of an application, system service, or a system manager.

7. An article of manufacture comprising a machine-accessible medium having content stored thereon to provide instructions to cause a machine to perform operations, including:
determining that a configuration setting obtained from a configuration storage includes a computable expression with system-independent variables to be resolved to be implemented in a configuration consumer, the determining including identifying a flag of the configuration setting, the flag to indicate the configuration setting has a computable expression;
resolving the computable expression to determine a system-dependent value for the configuration setting for a runtime implementation of a system configuration in the configuration consumer;
caching the system-dependent value for the configuration setting, as determined by resolving the computable expression, in a memory; and
implementing the configuration setting in the configuration consumer.

8. The article of manufacture of claim 7, wherein the instructions to perform resolving the computable expression further comprise instructions to perform:
obtaining a system-dependent property from a system profile.

9. The article of manufacture of claim 8, wherein the system profile includes hardware dependencies and system dependencies.

10. An apparatus comprising:
a network interface circuit to connect to a network having a configuration consumer to be configured and a configuration storage;
a configuration machine coupled to the network interface circuit to receive a configuration setting having system-independent values, to determine that the configuration setting includes a computable expression by identifying a flag of the configuration setting, the flag to indicate the configuration setting has a computable expression, and to send the computed expression to the configuration consumer;
a resolver coupled to the configuration machine to obtain a system-dependent value to resolve the value of the computable expression and return the resolved expression to the configuration machine; and
a cache to store the system-dependent value for the configuration setting, as determined by resolving the computable expression, in a memory.

11. The apparatus of claim 10, the resolver to obtain the system-dependent value comprises the resolver to obtain the system-dependent value from a system profile.

12. The apparatus of claim 11, wherein the system profile is stored in the configuration machine.

13. The apparatus of claim 10, the resolver to resolve the value of the variable expression in conjunction with resolving a parameterized value substitution.

14. A method for generating a configuration setting, comprising:
assigning a computable expression of system-independent value references as a configuration setting for a system configuration, the computable expression to be resolved to a static value at a runtime implementation of the system configuration;
grouping the computable expression configuration setting with a different indirect value expression configuration setting to generate a configuration template, the configuration template having system-independent configuration settings;
storing the template in a configuration storage, the template to provide the expressions to a system;
resolving the template to provide default configuration values to a system for configuration; and
applying the default configuration values to the system.

15. The method of claim 14, wherein the static value is fixed for the runtime implementation and re-evaluated at a subsequent runtime implementation.

16. The method of claim 14, wherein the different indirect value expression configuration setting comprises a parameterized value expression.

* * * * *